United States Patent [19]

Purvis et al.

[11] 3,983,296

[45] Sept. 28, 1976

[54] MODIFIERS FOR PVC FOAM, PROCESS FOR EXTRUDING MODIFIED PVC FOAM AND MODIFIED PVC FOAM COMPOSITIONS

[75] Inventors: Marshall T. Purvis; R. Peter Grant, both of Newtown, Pa.

[73] Assignee: Rohm and Haas Company, Philadelphia, Pa.

[22] Filed: Mar. 22, 1974

[21] Appl. No.: 453,627

[52] U.S. Cl. ............................ 428/315; 260/2.5 P; 264/45.5; 264/51; 264/211; 264/DIG. 5; 428/409
[51] Int. Cl.² ............................................ B29D 27/00
[58] Field of Search ............... 264/53, 54, 211, 45.5, 264/45.9, 51, 48, DIG. 5; 260/876, 2.5 P; 428/315, 409

[56] References Cited
UNITED STATES PATENTS

| 3,345,439 | 10/1967 | Everard et al. ............... 264/54 X |
| 3,440,309 | 4/1969 | Breukink et al. ............... 264/54 X |
| 3,448,173 | 6/1969 | Ryan et al. ...................... 260/876 R |
| 3,504,053 | 3/1970 | Williams ...................... 260/876 R X |
| 3,655,825 | 4/1972 | Souder et al. .................. 260/876 R |
| 3,657,172 | 4/1972 | Gallagher et al. ............. 260/876 R X |
| 3,689,598 | 9/1972 | Bierwirta et al. .............. 260/876 R |
| 3,764,638 | 10/1973 | Hwa et al. ...................... 260/876 R |
| 3,787,522 | 1/1974 | Dickie ............................ 260/876 R X |
| 3,793,406 | 2/1974 | Bortnick et al. ............... 260/876 R X |
| 3,804,925 | 4/1974 | Kato et al. ..................... 260/876 R X |
| 3,821,329 | 6/1974 | Gallagher ...................... 260/876 R X |
| 3,830,878 | 8/1974 | Kato ............................... 260/876 R |
| 3,833,686 | 9/1974 | Grochowski et al. ........... 60/876 R |
| 3,843,753 | 10/1974 | Owens ........................... 260/876 R |
| 3,853,968 | 12/1974 | Bortnick et al. ............... 260/876 R |

OTHER PUBLICATIONS

Zimmerman, O.T. and Irvin Lavine, "Supplement III to the 1953 Edition of Handbook of Material Trade Names," Dover, N.H., Industrial Research Service, Inc. 1960, p. 2.

*Primary Examiner*—Philip Anderson
*Attorney, Agent, or Firm*—Michael B. Fein

[57] ABSTRACT

A modifier system for extruding PVC foam comprising two separate core-shell polymers, the shells of which are substantially ungrafted to the cores. Also disclosed is an improved process for extruding PVC foam and improved extruded PVC foam composition and articles.

2 Claims, No Drawings

MODIFIERS FOR PVC FOAM, PROCESS FOR EXTRUDING MODIFIED PVC FOAM AND MODIFIED PVC FOAM COMPOSITIONS

The present invention relates to a modifier system for the production of rigid foamed vinyl chloride polymers, as well as to a process for extruding rigid vinyl chloride polymer foam, to the resultant composition and to processes for preparing the modifier system.

Polyvinyl chloride foam is an attractive thermoplastic material from which to form shaped articles as it has good physical properties, it is inert to a large number of chemicals and burns only with difficulty. It offers an attractive substitute for wood in many ways, since it is similar in appearance, is light in weight, can be sawed and nailed, and can be used in many decorative applications. Modifiers to improve impact strength and processability have been used commercially in vinyl chloride foam manufacture. Processing aids have allowed lower density foam to be produced and have improved the surface appearance. Impact modifiers have been found useful in making profiles resistant to splitting during nailing and sawing. However, it has been found that the existing modifier systems are deficient in one or more aspects. Prior modifier systems are often non-weatherable, have inferior heat stability at high extrusion rates, do not allow low densities over a wide temperature range of extrusion, and do not provide excellent impact strength.

It is an object of the present invention to provide a modifier system which has an outstanding combination of desirable properties including processability, impact strength, low density, weatherability, and improved heat stability at high extrusion speeds. It is a further object to provide a process for producing rigid vinyl chloride foam at very high processing efficiency and speeds without polymer decomposition during extrusion. An additional object is to provide a modified rigid PVC foam with high impact strength and low density, as well as good weatherability.

These and other objects as will become apparent from the following disclosure are achieved by the present invention which comprises a modifier system for extruding rigid polyvinyl chloride foam comprising a first core-shell polymer having a hard shell polymerized from a monomer system comprised of, in major part, $C_1$ to $C_4$ alkyl methacrylate having a molecular weight ($\overline{M}_v$) above 1.5 million, polymerized in the presence of, but substantially ungrafted to, a crosslinked core polymerized from a monomer mixture comprised of, in major part, a $C_2$ to $C_8$ alkyl acrylate, and about 0.1 to 5 weight percent, based on $C_2$ to $C_8$ alkyl acrylate, of a glycol dimethacrylate crosslinking agent; and a second core-shell polymer having a shell polymerized from a monomer mixture comprised of, in major part, a $C_1$ to $C_4$ alkyl methacrylate polymerized in the presence of, but substantially ungrafted to, a non-crosslinked core polymerized from a monomer or a monomer mixture comprised, in major part, of $C_1$ to $C_8$ alkyl acrylate. In another aspect, the invention comprises a process for extruding rigid polyvinyl chloride foam in which a blowing agent is incorporated in a vinyl chloride polymer containing the previously-mentioned modifier system. In yet another aspect, the invention comprises the improved rigid polyvinyl chloride foam containing the abovementioned modifier system.

When the term "vinyl chloride polymer" or PVC is used, it is meant to include homopolymers of vinyl chloride as well as copolymers of vinyl chloride containing up to 20% by weight of other monovinylidene compounds copolymerizable therewith. The other monovinylidene monomers copolymerizable therewith are vinyl esters, such as vinyl acetate, vinylidene chloride, and alkyl esters of unsaturated mono- or dicarboxylic acids such as acrylic acid, methacrylic acid, maleic acid and fumaric acid, olefins such as ethylene and propylene, and the like. The homopolymers of vinyl chloride and copolymers with ethylene and propylene are preferred.

A blowing agent is incorporated into either chips or a powder of the vinyl chloride polymer, or alternatively the blowing agent can be mixed with the molten polymer composition under pressure, for example, in the barrel of an extruder. Generally about 0.1 to 5 parts by weight of blowing agent per 100 parts PVC are suitable, but larger and smaller amounts could be used for special purposes. Suitable blowing agents that can be used are, for example, organic liquids and gases, which can be absorbed by polyvinyl chloride and have boiling points substantially below the processing temperature of the PVC, and solid blowing agents which decompose on heating to yield a gas that is inert to the modified PVC composition. A few examples of suitable organic liquids and gases include halocarbons such as dichlorodifluoromethane, dichlorofluoromethane, trichlorofluoromethane, etc., methyl chloride, ethyl chloride, vinyl chloride, nitrogen, and dimethyl ether. Mixtures of these blowing agents with other easily volatile organic compounds such as aliphatic or olefinic hydrocarbons, which themselves only have a slight swelling effect, are also suitable. Examples of suitable solid blowing agents include those compounds which liberate nitrogen on heating, for example azo compounds, such as azodiisobutyronitrile and azobisformamide, hydrazo compounds, and compounds containing the nitroso group.

The modifier system can be added to the polyvinyl chloride in any suitable manner. For example, it can be added to the vinyl chloride polymerization mixture at the beginning of the polymerization process or towards the end of the process or at any suitable intermediate point. The modifier system can also be added at the drying stage, for example by adding it in the form of a latex to the product of the vinyl chloride polymerization, and the two polymers co-dried, for example, in a spray dryer. The modifier and the PVC in dry form can be mixed in any suitable manner such as on a two roll mill or in a Banbury mixer, or tumble-mixed, or in an extruder with a mixing head.

The amount of modifier which should be mixed with the vinyl chloride polymer in order to achieve a desired effect is best determined by simple experimentation. For optimum conditions, it is preferred that the modifier comprise about 5 to 15% by weight of the blend with PVC. Usually, not more than 25 parts of the modifier nor less than about 1 part of the modifier are used per 100 parts of the vinyl chloride polymer composition and it has been found that amounts of 3 to 20 parts per 100 parts are very effective for most applications.

The ratio of the first core-shell polymer to the second can be varied over a broad range, generally in the range of about 20:1 to 2:1, preferably 13:1 to 4:1, and more preferably 10:1 to 5:1.

The first core-shell polymer has a hard shell polymerized from a monomer system comprising, in major part, a $C_1$ to $C_4$ alkyl methacrylate. The preferred monomer systems are methyl methacrylate alone and mixtures of alkyl methacrylates. Also suitable are mixtures of alkyl methacrylate with certain other copolymerizable monoethylenically unsaturated compounds such as acrylic esters, nitriles, vinyl halides, vinyl esters, styrenes, vinyl toluenes, and the like. It is preferred that the shell monomer system be all acrylic, however, and that it have a molecular weight ($M_r$) above 1.5 million. Preferably the molecular weight of the shell polymer of the first core-shell polymer is above 2 million. The shell polymer is polymerized in the presence of a crosslinked core polymer, but is substantially ungrafted thereto. The core monomer or monomer mixture is comprised of, in major part, a $C_2$ to $C_8$ alkyl acrylate or mixtures thereof with each other or one or more different monoethylenically unsaturated monomers copolymerizable therewith such as methacrylic esters, nitriles, styrenes, and the like, and about 0.1 to 5 weight percent based on the core monomer system of a glycol dimethacrylate crosslinking agent. The preferred crosslinking agent is 1,3-butylene glycol dimethacrylate. The preferred weight ratio of shell to core is about 40:60 to about 75:25, and the most preferred ratio is about 65:35 to 75:25.

As to degree of grafting between the shell and the core, by "substantially ungrafted" is meant less than about 20% grafting as determined by the method described below, preferably, less than about 10% and most preferably below about 5% attached by weight. Grafting or degree of attachment, is determined by solvent extraction of the shell polymer, drying the extract, subtracting the dried extract weight from the total shell weight, and dividing by total shell weight.

The second core-shell polymer has a shell polymerized from a monomer mixture comprised of, in major part, a $C_1$ to $C_4$ alkyl methacrylate or mixture thereof. Again, the preferred methacrylate is methyl methacrylate. The monomer system for the shell can also comprise other copolymerizable monoethylenically unsaturated monomers including those mentioned for the first core-shell polymer. The molecular weight ($\overline{M}_r$) of the shell polymer is preferably as high as possible, generally at least about 450,000 and the shell is polymerized in the presence of a core polymer as described below, but is substantially ungrafted to the core polymer. The core polymer is polymerized from a monomer or monomer mixture comprising, in major part, at least one $C_1$ to $C_8$ alkyl acrylate. Other copolymerizable monoethylenically unsaturated monomers can be used in minor part and can be any of those mentioned for the first core-shell polymer. As opposed to the core for the first core-shell polymer, the core for the second polymer does not contain crosslinking agent and thus its molecular weight is determinable. Preferably, the molecular weight ($\overline{M}_r$) of the core of the second core-shell polymer is low, i.e., under about 100,000 and preferably under about 50,000 on the average. It is preferred that it have a molecular weight of at least about 5,000 and the optimum molecular weight range is about 10,000 to 50,000.

The weight ratio of the shell to the core in the second core-shell polymer can vary broadly and, in some cases, the shell can be minimal or even absent. The preferred weight ratio range of shell to core is about 60:40 to 0:100 with the more preferred range about 55:45 to 20:80, the most preferred range being 55:45 to 40:60.

In one preferred embodiment, al of the monomers in the modifier system are acrylic. This system is the most weatherable one of the invention.

The modifier of the invention is much more efficient than previously known modifiers for extruding PVC foam. By efficient is meant that the processor can achieve desired density, physical properties such as impact strength, and higher processing ease with less modifier than previously necessary with other modifiers. The modifier system of the invention is also more efficient in the aspect that lower densities can be achieved over a wider range of extrusion temperatures as compared to modifiers of the prior art.

In addition to the modifier system of the invention and the blowing agents previously described, other additives typically used are stabilizers, lubricants, pigments and nucleating agents.

The ingredients of the formulation are mixed in a high intensity mixer and introduced into an extruder which has been set to a proper temperature profile at the various zones of the extruder. Generally, there is a back pressure on the die of the extruder of approximately 1000 to 1500 psi. The formulation is extruded through the die in the shape of the desired finished profile and, generally, thereafter introduced into a vacuum sizer to finish the extruded article. Typical extrusion temperatures are in the range of 250° to 400°F. with the more usual range being above 300° and, in the case of homopolymers of vinyl chloride, in the range of 370° to 380°F.

The modifier of the invention is really a blend of two-core shell polymers.

Preferably the two-core shell polymers are coisolated, most preferably by co-spray drying. By co-spray drying is meant blending emulsions of the two-core shell polymers and isolating by spray drying techniques. Alternatively, the emulsions of the two-core shell polymers can be blended with an emulsion of vinyl chloride polymer and simultaneously spray dried, but this latter technique is less preferred. Also, the two polymers can be coagulated together, freeze dried, or isolated in other ways. In an alternative technique the two polymers can be prepared simultaneously by polymerizing the shells from a single shell-forming monomer system in the presence of a mixture of the emulsions of the two cores, thereby "co-encapsulating."

The following non-limiting examples illustrate but a few embodiments of the invention and compare some of its characteristics with those of the prior art. Single slashes are used to separate each monomer or catalyst in a phase, and double slashes used to separate phases. The first phase is written first, and other abbreviations used are as follows: BA is butyl acrylate, MMA is methyl methacrylate, BGDMA is 1,3-butylene glycol dimethacrylate, St is styrene, and EA is ethyl acrylate.

EXAMPLE I

This example illustrates preparation of one embodiment of the first core-shell polymer.

To a suitable reaction vessel equipped with stirrer, reflux condenser, and nitrogen inlet is charged 733 parts of deionized water and 0.08 parts of glacial acetic acid. The mix is sparged for 30 minutes with nitrogen and the temperature adjusted to 32°C. A freshly prepared solution of 0.36 parts sodium formaldehyde sulfoxylate in 2 parts water is added and the nitrogen sparge discontinued. Over a period of 15 minutes is then added 45 parts of emulsified monomer mix (EMM) consisting of 355 parts BA, 3.5 parts BGDMA, 0.5 parts cumene hydroperoxide, 6.4 parts sodium lauryl sulfate, and 83 parts of water. The temperature rises and peaks; after peaking, the remainder of the EMM is added over a period of 100 minutes. The emulsion is cooled to 45°. A solution of 1.6 parts sodium lauryl sulfate in 156 parts degassed, deionized water is added, followed by addition over 30 minutes of a mixture of 593 parts of MMA and 69 parts of EA. A solution of 5 parts sodium formaldehyde sulfoxylate in $H_2O$ is added; over a 15 minute period, 0.27 parts of cumene hydroperoxide are added. After three hours, the batch is cooled and filtered. Solids are 49.9%; theoretical is 50%. The ratio of core//shell is 35//65. Degree of grafting as determined by the solvent extraction method was found to be approximately 5%. The molecular weight ($\overline{M}_v$) of the second stage was determined to be between about 1.8 and 2.5 million.

EXAMPLE II

This example illustrates a preparation for the second core-shell polymer.

To a suitable reactor equipped with stirrer, reflux condenser and nitrogen sweep is added 197.1 parts water and 42 parts of potassium persulfate. With stirring, the mixture is heated to 45°C. From a separate vessel is fed over a 10 minute period 180 parts of EMM consisting of 327.5 parts water, 6.7 parts sodium lauryl sulfate, 1.7 parts sodium carbonate, 840 parts BA and 25 parts t-dodecyl mercaptan. The reaction vessel is heated until the temperature reaches 60°. The reaction exotherms to about 68°C. Ten minutes after the peak exotherm is reached, the remainder of the EMM is added over a 1-hour period. The temperature is held at 84°–86°C. for one hour after completion of adding, is cooled to 45°C., and 35 parts of glacial acetic acid added. A second EMM is prepared, consisting of 419 parts MMA and 4.2 parts sodium lauryl sulfate in 1560 parts water. To the reaction vessel is added 0.5 parts sodium formaldehyde sulfoxylate in 33 parts water, and immediately the second EMM mix is added over a 60 minute period. At the same time, 0.8 parts of cumene hydroperoxide are added over the 90-minute period. The temperature rises to 70°C., and is held at that point for one hour after the EMM feed is complete. 0.13 parts of cumene hydroperoxide, 0.08 parts of sodium formaldehyde sulfoxylate, and 21 parts of sodium lauryl sulfate are added during the hold period. The batch is cooled and filtered. Solids are 36%. The ratio of core//shell is 67//33. The degree of grafting between the core and the shell was estimated to be less than 5%. The molecular weight ($\overline{M}_v$) of the first stage was determined to be between about 10,000 and 40,000, and the second stage molecular weight was about 400,000 to 800,000.

EXAMPLE III

This example illustrates embodiment of the modifier system and a method of co-isolation of the two core-shell polymers.

The emulsions from Examples I and II are blended in a ratio of 26 parts of I to 4 parts of II. The polymer blend is coisolated by spray-drying to yield a white, free-flowing powder.

EXAMPLE IV

This example illustrates the preparation of another embodiment of the modifier system of the invention.

In the manner described in Example I and II above are prepared a BA/BGDMA/MMA (99/1/100) polymer in a core//shell weight ratio of 30//70 and a BA/t-dodecyl mercaptan//MMA polymer in a core//shell weight ratio of 50//50. These polymers are blended in a weight ratio of 13//2 and consolidated as in Example III.

EXAMPLE V

A. This example illustrates preparation of a modified PVC/blowing agent formulation in accordance with the invention suitable for extruding into PVC foam. A powder blend of the following ingredients was prepared in a Henschel mixer: 100 parts vinyl chloride homopolymer (K = 61), 15 parts modifier system of Example IV, 1.5 parts dimethyl tin-S,S'-bis-(alkyl mercaptoacetate) as stabilizer, 5 parts $TiO_2$ as pigment, 0.5 parts barium stearate as lubricant, 0.5 parts stearic acid as lubricant, 1.5 parts epoxidized soybean oil as plasticizer, and about 1 part azobisformamide as blowing agent.

B. (Comparative) Example V-A was repeated except that the following prior art modifier system was substituted for the modifier of Example IV. 8 parts of a core-shell polymer of MMA and EA having an overall MMA to EA ratio of 90:10 with the shell molecular weight being about 1 million and degree of grafting being about less than 5%, 2 parts of a core-shell polymer having an essentially BA/St copolymer core and an MMA shell, ratio of core/shell being 60:40, first stage molecular weight about 20,000 and with second stage molecular weight being about 700,000, and 5 parts of a polymer having a butyl acrylate core crosslinked with glycol diacrylate, an MMA shell, the shell molecular weight being about 200,000 to 400,000, the degree of grafting being about 80 to 85%, and a core to shell ratio of 70:30.

C. (Comparative) Example V-B was repeated except that 11.25 parts of the first core-shell polymer were used in combination with 3.75 parts of the last core-shell polymer, with the second of the three polymers described in Example V-B being absent.

EXAMPLE VI

This example shows the efficiency of the PVC foam formulation of the invention containing the modifier system of the invention. Processing aid efficiency was determined by surface appearance of samples extruded on a 1-inch Killion laboratory extruder at high melt temperature (390°F.) at varying concentrations. Surface quality was rated on a scale from 1 to 5 with 1 being excellent, smooth, glossy surface and 5 being a poor, blown, pitted surface. Densities are reported in g./cc. As shown in Table I, the formulation of Example V-A had the best surface over the widest range of concentration. Since surface quality below 3 is not considered commercially acceptable, it can also be seen from the table that the fomulation of the invention allows the manufacture of acceptable products over the widest range of concentration of modifier system.

TABLE I

| Formulation of Example | | Concentration (wt. parts/hundred) | | | | |
|---|---|---|---|---|---|---|
| | | 15 | 13.5 | 12.0 | 10.5 | 9.0 |
| V-A | Surface | 1 | 1 | 1 | 2 | 3 |
| | Density | 0.67 | 0.65 | 0.65 | 0.66 | 0.65 |
| | Surface | 2 | 2 | 4 | 5 | not |

TABLE I-continued

| Formulation of Example | | Concentration (wt. parts/hundred) | | | | |
|---|---|---|---|---|---|---|
| | | 15 | 13.5 | 12.0 | 10.5 | 9.0 |
| V-B | Density | 0.73 | 0.67 | 0.63 | 0.60 | run |
| | Surface | 2 | 1 | 4 | 4 | not |
| V-C | Density | 0.67 | 0.74 | 0.67 | 0.68 | run |

EXAMPLE VII

A. The modified PVC formulation of the invention shown in Example V-A was evaluated for impact strength by measuring an inside corner molding extruded on commercial equipment by the Gardner impact test which involves a 4 pound weight with ½ inch diameter nose and ⅝ inch diameter female die hole and with failure values defined by the drop height at which first cracking appears on the underside of the specimen. The results appear in Table II.

B. In the same manner as Example VII-A, the comparative formulation shown in Example V-B was evaluated for impact strength with the results shown in Table II:

C. A comparative formulation was prepared as follows: The formulation prepared in Example V-B was repeated except that the 5 parts of the third polymer was replaced by 5 parts of the following MBS impact modifier: 1,3-butadiene/St//St//MMA having the weight ratio 60(78/22)//18//22 with the final phase molecular weight being 500,000. The impact strength was measured and the results shown in Table II.

D. The density and thickness of the three extrusions were kept as close as possible in order to most fairly compare the impact strength, and the results were as shown in the following Table II.

TABLE II

| Formulation of Example | Density gm/cc | Thickness (mils) | Gardner Impact (in.-lbs.) | | |
|---|---|---|---|---|---|
| | | | Room Temp. | 20°F. | -20°F. |
| VII-A | 0.61 | 195 | 74 ± 7 | 44 ± 3 | 28 ± 3 |
| VII-B | 0.58 | 195 | 54 ± 3 | 35 ± 3 | not run |
| VII-C | 0.58 | 175 | 28 ± 6 | 24 ± 1 | not run |

E. Foam moldings produced from Examples VII-A, B and C were exposed for 3 months outdoors in Phoenix, Arizona. Moldings VII-A and B were unchanged in color after 3 months, whereas molding VII-C yellowed badly. Gardner impact determinations on these same moldings showed only a 10% loss in impact strength for VII-A and B compared to complete loss in impact strength for VII-C.

EXAMPLE VIII

This example illustrates the comparative decompositions behavior of a PVC foam formulation containing the modifier system of invention vs. a formulation containing other modifier systems. The formulation of the invention was at least 50% more efficient than formulations V-B, V-C or VII-C, as determined by degree of decomposition during extrusion under severe temperature conditions.

EXAMPLE IX

Example IV was repeated and compared to a formulation which is the same except that the BGDMA in the first core-shell polymer is replaced with an equal weight of 1,3-butylene glycol diacrylate. This formulation was denominated IX-A.

Another formulation was made repeating Example IV except for eliminating the BGDMA cross-linker in the first core-shell polymer and this formulation was denominated IX-B. The three formulations were extruded and compared in surface quality, impact strength, minimum density, and degree of decomposition. Example IV was the best on surface quality with IX-A and IX-B about equal to each other. Example IV was about equal to IX-A on impact strength, but both were much better than Example IX-B. The three examples were about equal on minimum density. Example IV and IX-B have better heat stability than Example IX-A.

EXAMPLE X

This example shows the improved tolerance of the modifier of the invention to changes in extrusion temperature.

Examples V-A, V-B, and V-C were repeated except that the modifier level was reduced from 15 parts to 12 parts. The ratios of modifier mixtures were kept the same however. The three formulations containing the different modifier systems were run at three different temperatures and the surface and density were determined. Surfaces of 4 and 5, as before, are completely unacceptable commercially.

TABLE III

| Formulation | | Surface/Density Temperature | | |
|---|---|---|---|---|
| | | 380°F. | 390°F. | 400°F. |
| V-A | Surface | 1 | 2 | 3 |
| | Density | .65 | .63 | .68 |
| V-B | Surface | 2 | 5 | 5 |
| | Density | .69 | .61 | .72 |
| V-C | Surface | 2 | 4 | 5 |
| | Density | .68 | .61 | .58 |

As can be seen from the above Table III it is only formulation V-A, that of the invention, which has acceptable surface and density over the whole range of temperatures of extrusion (melt temperature).

EXAMPLE XI

This example shows that the modifier system of the invention gives good surface and density over a wider range of blowing agent concentration than those of the prior art. Examples V-A and V-B were repeated, and the modifier level in both cases remained 15 parts per 100 parts of PVC. The blowing agent concentration was varied from 0.75 to 1.75 parts per 100 parts of PVC and the surface and density were determined. As can be seen from the following Table, the modifier of the invention has a greater ability to contain the hot gas generated during foaming of PVC.

TABLE IV

| Formulation | | Blowing Agent Concentration (phr) | | | | |
|---|---|---|---|---|---|---|
| | | 0.75 | 1.0 | 1.25 | 1.50 | 1.75 |
| V-A | Surface | 1 | 1 | 1 | 3.5 | 3.5 |
| | Density | .73 | .63 | .50 | .49 | .40 |
| V-B | Surface | 2 | 1 | 5 | 5 | 5 |

TABLE IV-continued

| Formulation | Blowing Agent Concentration (phr) | | | | |
|---|---|---|---|---|---|
| | 0.75 | 1.0 | 1.25 | 1.50 | 1.75 |
| Density | .77 | .58 | .54 | .66 | .81 |

We claim:

1. A process for extruding a foamed product at high efficiency and with smoother surfaces at a given throughput and concentration of modifier comprising introducing a composition comprising 100 parts by weight of polyvinyl chloride or copolymers of vinyl chloride containing up to 20% by weight of other monovinylidine compounds, a blowing agent and about 1 to 25 parts by weight of a modifier system comprising:

a first core-shell polymer having a hard shell polymerized from a shell-forming monomer system comprised of, in major part, at least one $C_1$ to $C_4$ alkyl methacrylate, having a molecular weight ($\overline{M}_v$) above 1.5 million, polymerized in the presence of, but substantially ungrafted to, a crosslinked core polymerized from a core-forming monomer system comprised of, in major part, $C_2$ to $C_8$ alkyl acrylate, and about 0.1 to 5 weight percent, based on $C_2$ to $C_8$ alkyl acrylate, of a glycol dimethacrylate crosslinking agent, the weight ratio of shell to core being about 40:60 to 75:25; and a second core-shell polymer having a shell polymerized from a shell-forming monomer system comprised of, in major part, at least one $C_1$ to $C_4$ alkyl methacrylate, polymerized in the presence of, but substantially ungrafted to, a core polymerized from a monomer or monomer mixture comprising, in major part, at least one $C_1$ to $C_8$ alkyl acrylate;

into a plasticating extruder and extruding said composition at a temperature of about 250°–400°F. through a die to foam said smoother surfaced product.

2. A smooth, glossy surfaced, impact resistant, low density foamed product produced by the process of claim 1.

* * * * *